United States Patent
Ahrari et al.

(10) Patent No.: US 8,170,506 B2
(45) Date of Patent: May 1, 2012

(54) DIRECT CURRENT (DC) OFFSET CORRECTION USING ANALOG-TO-DIGITAL CONVERSION

(75) Inventors: Bahman Ahrari, Los Gatos, CA (US);
Hee Choul Lee, San Jose, CA (US);
Jin-Su Ko, San Jose, CA (US); Sang Oh Lee, Cupertino, CA (US)

(73) Assignee: Qualcomm Incorporated, San Diego, CA (US)

( * ) Notice: Subject to any disclaimer, the term of this patent is extended or adjusted under 35 U.S.C. 154(b) by 797 days.

(21) Appl. No.: 12/181,904

(22) Filed: Jul. 29, 2008

(65) Prior Publication Data
US 2010/0026383 A1     Feb. 4, 2010

(51) Int. Cl.
*H04B 1/04*     (2006.01)
*H04B 17/00*     (2006.01)

(52) U.S. Cl. ............ 455/114.2; 455/115.1; 455/67.13

(58) Field of Classification Search ........... 455/115.1, 455/114.2, 67.11, 67.13, 296, 63.1, 501; 375/219, 221, 296
See application file for complete search history.

(56) References Cited

U.S. PATENT DOCUMENTS

| | | | |
|---|---|---|---|
| 7,409,199 B2 * | 8/2008 | Igarashi et al. | 455/296 |
| 7,672,364 B2 * | 3/2010 | Kang et al. | 375/221 |
| 7,760,817 B2 * | 7/2010 | Lin | 375/302 |
| 7,782,928 B2 * | 8/2010 | Kang et al. | 375/221 |
| 7,899,431 B2 * | 3/2011 | Rahman et al. | 455/324 |
| 7,986,925 B2 * | 7/2011 | Alford et al. | 455/115.1 |
| 2005/0141634 A1 | 6/2005 | Lin | |
| 2006/0094361 A1 | 5/2006 | Darabi | |
| 2009/0233562 A1 * | 9/2009 | Kim et al. | 455/115.1 |
| 2010/0151802 A1 * | 6/2010 | Chen et al. | 455/108 |

OTHER PUBLICATIONS

International Search Report and Written Opinion—PCT/US2009/052161, International Search Authority—European Patent Office—Dec. 29, 2009.

* cited by examiner

*Primary Examiner* — Sonny Trinh
(74) *Attorney, Agent, or Firm* — Eric Ho

(57) ABSTRACT

Techniques for reducing or eliminating DC (direct current) offset in transmitters are disclosed. An apparatus for DC offset reduction may include a converter, a digital engine, and a plurality of programmable current supplies. The converter is configured to provide digital representations of a plurality of DC currents associated, respectively, with a plurality of differential signal legs. The digital engine is configured to receive the digital representations and to produce instructions for generating compensating currents for the plurality of differential signal legs based on comparisons, respectively, between each of the digital representations and a calibration current. The programmable current supplies correspond, respectively, to the differential signal legs. The current supplies are configured to inject the compensating currents into the differential signal legs, respectively, to reduce DC offset between the differential signal legs, based upon the instructions. The instructions allow one-shot DC offset correction, instead of successive approximation for DC offset correction.

29 Claims, 3 Drawing Sheets

DIRECT CURRENT (DC) OFFSET CORRECTION USING ANALOG-TO-DIGITAL CONVERSION

BACKGROUND

1. Field

This invention is generally related to wireless communications, and more particularly, to techniques for reducing or eliminating DC (direct current) offset in transmission paths.

2. Background

Signal paths in radio frequency (RF) transmitters sometimes have undesirable DC offsets. DC offset often refers to a relatively constant offsetting of a signal from zero. In other circumstances, DC offset may alternatively refer to offsetting that occurs between differential signals. In contemporary digital communication systems, such as mobile cellular systems, the latter type of DC offset, that occurring between differential signals, may be particularly problematic. For example, in digital communication systems transmitting in-phase (I) and quadrature (Q) signal components, undesirable DC offsets may occur between differential signals representing the I and Q components, such as $I_p$, $I_m$, $Q_p$ and $Q_m$ differential signals. Such DC offsets may result in LO (local oscillator) carrier leakage and a degradation of EVM (error vector magnitude).

A DC offset may be due to mismatches in a signal path. For example, the DC offset may be due to mismatches between circuit components and/or leakage from circuit components along the path. DC offsets are typically inherent, undesirable aspects of active analog circuitry that generally must be eliminated or reduced before the signal is up-converted and transmitted.

Various techniques have been employed to minimize DC offset in transmitters. However, the previous attempts remain inadequate to address the DC offsets found in certain communication technologies, such as mobile cellular systems.

SUMMARY

Disclosed herein is a new and improved approach to reducing or eliminating DC (direct current) offsets in mobile communication system transmitters.

In accordance with an aspect of the approach, an apparatus generates a transmitted signal with a reduced DC offset. The apparatus may include a converter, a digital engine, and a plurality of programmable current supplies. The converter is configured to provide digital representations of a plurality of DC currents associated, respectively, with a plurality of differential signal legs. The digital engine is configured to receive the digital representations and to produce instructions for generating compensating currents for the plurality of differential signal legs based on comparisons, respectively, between each of the digital representations and a calibration current. The programmable current supplies correspond, respectively, to the differential signal legs The current supplies are configured to inject the compensating currents into the differential signal legs, respectively, to reduce DC offset between the differential signal legs, based upon the instructions.

In accordance with another aspect of the approach, a method of reducing DC offset in a transmission path generally includes determining a plurality of DC currents, where the DC currents are respectively associated with a plurality of differential signal legs in the transmission path; selecting a calibration current; determining the difference between each of the DC currents and the calibration current to produce a plurality of differences; and injecting each of the differences into a respective differential signal leg. By applying the differences to the signal legs, the DC offsets may be quickly corrected in a one-shot manner, rather than in successive approximations, which require multiple iterations of adjusting a compensating DC current to finally arrive at a desire DC offset correction.

In accordance with a further aspect of the approach, a computer-readable medium, embodying a set of instructions executable by one or more processors, includes code for determining a plurality of DC currents, the DC currents respectively associated with a plurality of differential signal legs in a transmission path; code for selecting a calibration current; code for determining the difference between each of the DC currents and the calibration current to produce a plurality of differences; and code for injecting each of the differences into a respective differential signal leg.

In accordance with a yet another aspect of the approach, an apparatus includes means for providing digital representations of a plurality of DC currents associated, respectively, with a plurality of differential signal legs; means for receive for producing instructions to generate compensating currents for the plurality of differential signal legs based on comparisons, respectively, between each of the digital representations and a calibration current; and means for injecting the compensating currents into the differential signal legs, respectively, to reduce DC offset between the differential signal legs, based upon the instructions.

Other systems, methods, aspects, features, embodiments and advantages of the improved DC offset reduction technique disclosed herein will be, or will become, apparent to one having ordinary skill in the art upon examination of the following drawings and detailed description. It is intended that all such additional systems, methods, aspects, features, embodiments and advantages be included within this description, and be within the scope of the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the apparatus and methods disclosed herein. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the appended claims.

Figure 1:
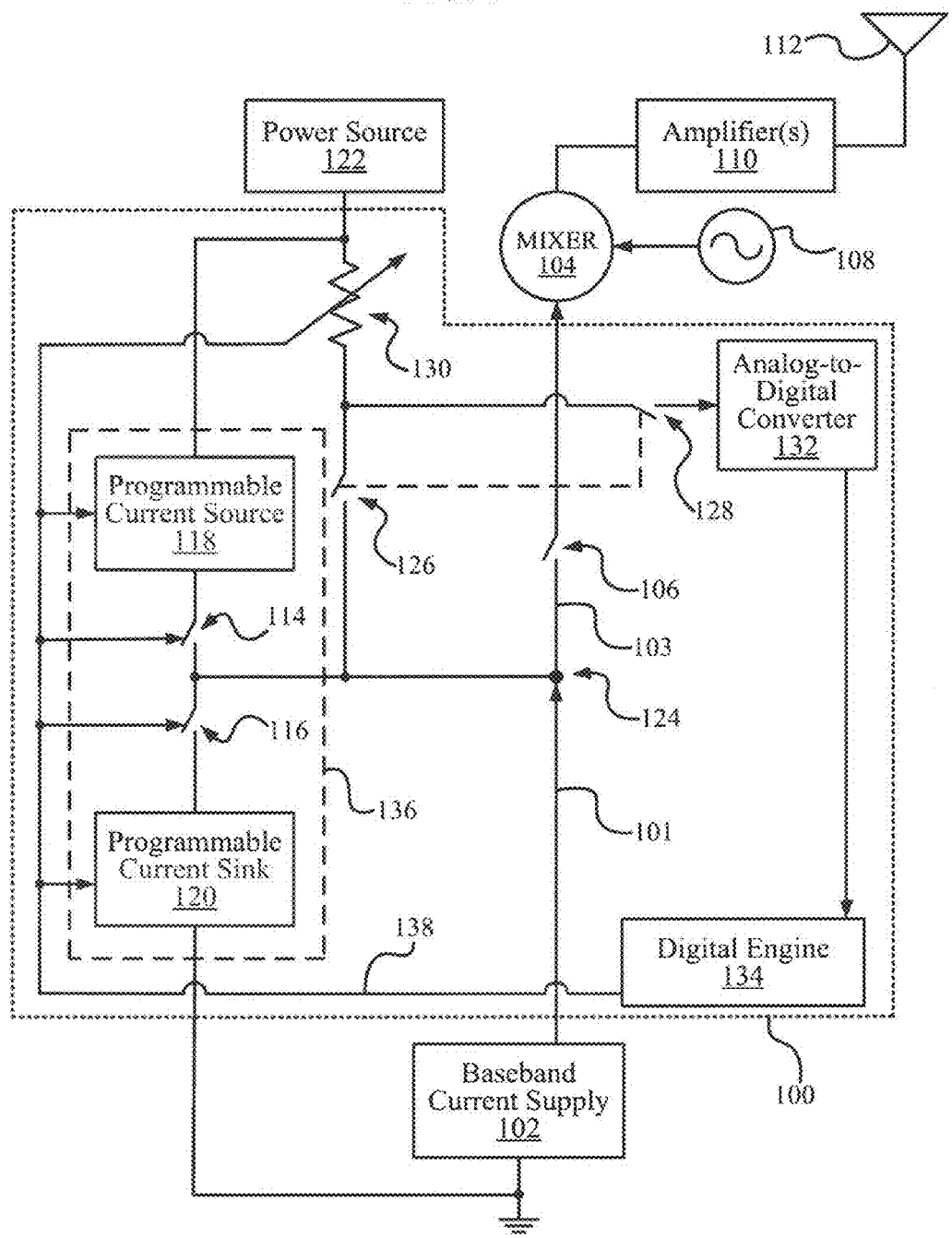
FIG. 1 is a block diagram of a DC offset correction loop for a differential signal as it may be implemented in a transmitter.

FIG. 1 shows a block diagram of transmitter components, including a DC offset correction loop 100. During an operation in which the transmitter might operate without DC offset correction, a baseband current supply 102 may provide a differential signal leg on line 101 to a mixer 104 through a switch 106. Mixer 104 may combine the differential signal leg with the output of an oscillator 108, and provide the resulting signal to one or more amplifiers 110 to be transmitter through antenna 112. In an alternative configuration of the loop 100, the switch 106 may be omitted and its functionality instead implemented by selectively turning off the mixer gate 104. As is known to those skilled in the art, the baseband current supply 102 may supply a differential signal leg such as, but not limited to, a quadrature signal leg, such as but not limited to Ip, Im, Qp, and Qm, which may be supplied for and included in a plurality of transmission paths.

During a normal operation in which DC offset correction is provided, switches 114 and 116 may be operated according to allow a programmable current source 118 and a programmable current sink 120 to provide and subtract, respectively, a compensating current to reduce DC offsets in the differential signal leg. Alternatively, the switches 114 and 116 may be omitted and their functionality instead implemented by selectively turning off the programmable current source 118 and current sink 120. The programmable current source 118 and current sink 120 may be implemented using digital-to-analog converters (DACs). The various components may be energized through a power source 122. The compensating current may be introduced at a current injection point 124 resulting in a DC offset corrected signal leg on line 103. Such undesired DC offsets may be introduced to the differential signal leg through the baseband current supply 102. For example, such DC offsets may be introduced into the differential signal leg through the operation of one or more current digital-to-analog converters represented by with the baseband current supply 102, and/or through the operation of one or more baseband filters represented the by baseband current supply 102.

During a calibration operation, switches 106, 114, and 116 may be opened, while calibration switches 126 and 128 are closed. During the calibration operation, the DC currents associated with the differential signal leg may be read through the operation of a resistor array 130, an analog to digital converter 132, and a digital engine 134. The digital engine 134 may be designed and operated according to operate the programmable current source 118, programmable current sink 120, and switches 114 and 116. The programmable current source 118, programmable current sink 120, and switches 114 and 116 may be collectively referred to as a DC offset current supply 136. The digital engine 134 may provide operating instructions to the DC offset current supply 136 by introducing programming bits on line 138 to result in the introduction of the compensating current during the normal operation at current injection point 124.

The digital engine 134 may be implemented in hardware, software, firmware or any suitable combination of the foregoing. For example, the digital engine 134 may be implemented, at least in part, with one or more general purpose processors, digital signal processors (DSPs), application specific integrated circuits (ASICs), field programmable gate arrays (FPGAs), intellectual property (IP) cores or other programmable logic devices, discrete gates or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 2:
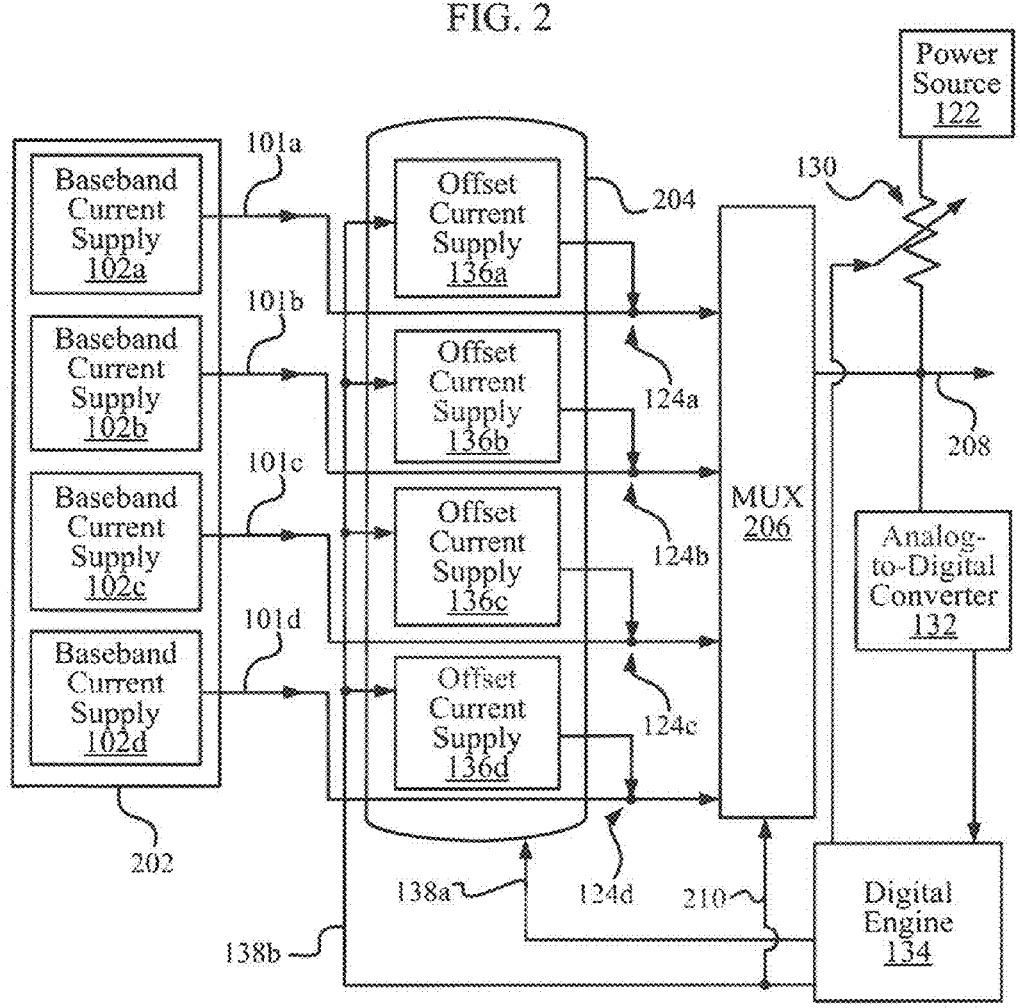
FIG. 2 is a block diagram illustrating an exemplary implementation of a plurality of DC offset correction loops in a transmitter.

FIG. 2 shows a block diagram of transmitter components illustrating an exemplary implementation of a plurality of DC offset correction loops in a transmitter. Each of the DC offset loops may be based on the DC offset correction loop 100 illustrated in FIG. 1. FIG. 2 shows a baseband block 202 that includes a plurality of baseband current supplies, for example the four baseband current supplies 102a, 102b, 102c, and 102d. The baseband current supplies 102a-d may include, respectively, one or more baseband filters and/or current digital-to-analog converters corresponding to each differential signal leg. The baseband block 202 provides differential signal legs that may represent quadrature signal legs, such as, but not limited to, Ip, Im, Qp, and Qm, on lines 101a, 101b, 101c and 101d, respectively.

An offset current supply block 204 includes a plurality of programmable offset current supplies, for example, offset current supplies 136a, 136b, 136c, and 136d. The offset current block 204 provides a plurality of compensation currents to be combined with the plurality of differential signal legs, respectively, from baseband current supplies 102a, 102b, 102c, and 102d, at a plurality of current injection points, for example, current injection points 124a, 124b, 124c, and 124d.

A multiplexer 206 receives the DC offset corrected signal legs, processes the corrected signal legs, and produces a resulting multiplexed signal on line 208. The programming bits introduced by digital engine 134 that were considered in regard to FIG. 1, may include a first set of programming bits to supply a bias current on line 138a to the offset current supply block 204, and a second set of programming bits to provide operating instructions on line 138b to the DC offset current supplies 136a, 136b, 136c, and 136d. The multiplexer 206 may also include a plurality of switches (not illustrated in FIG. 2) to perform the functions associated with switches 126 and 128 illustrated in FIG. 1. Digital engine 134 may provide instructions to the multiplexer 206 switches through line 210.

The resistor array 130 is connected between the power source 122 and line 208. In an alternative configuration (not shown), four resistor arrays may be included, each connected between the power source 122 and a respective injection point 124a-d and controlled by the digital engine 134.

The transmitter components of FIGS. 1 and 2 may be included in a wireless communication device (WCD) that communicates with a plurality of base stations (not shown), preferably using a CDMA (code division multiple access) scheme or a W-CDMA (wideband CDMA) scheme.

Figure 3:
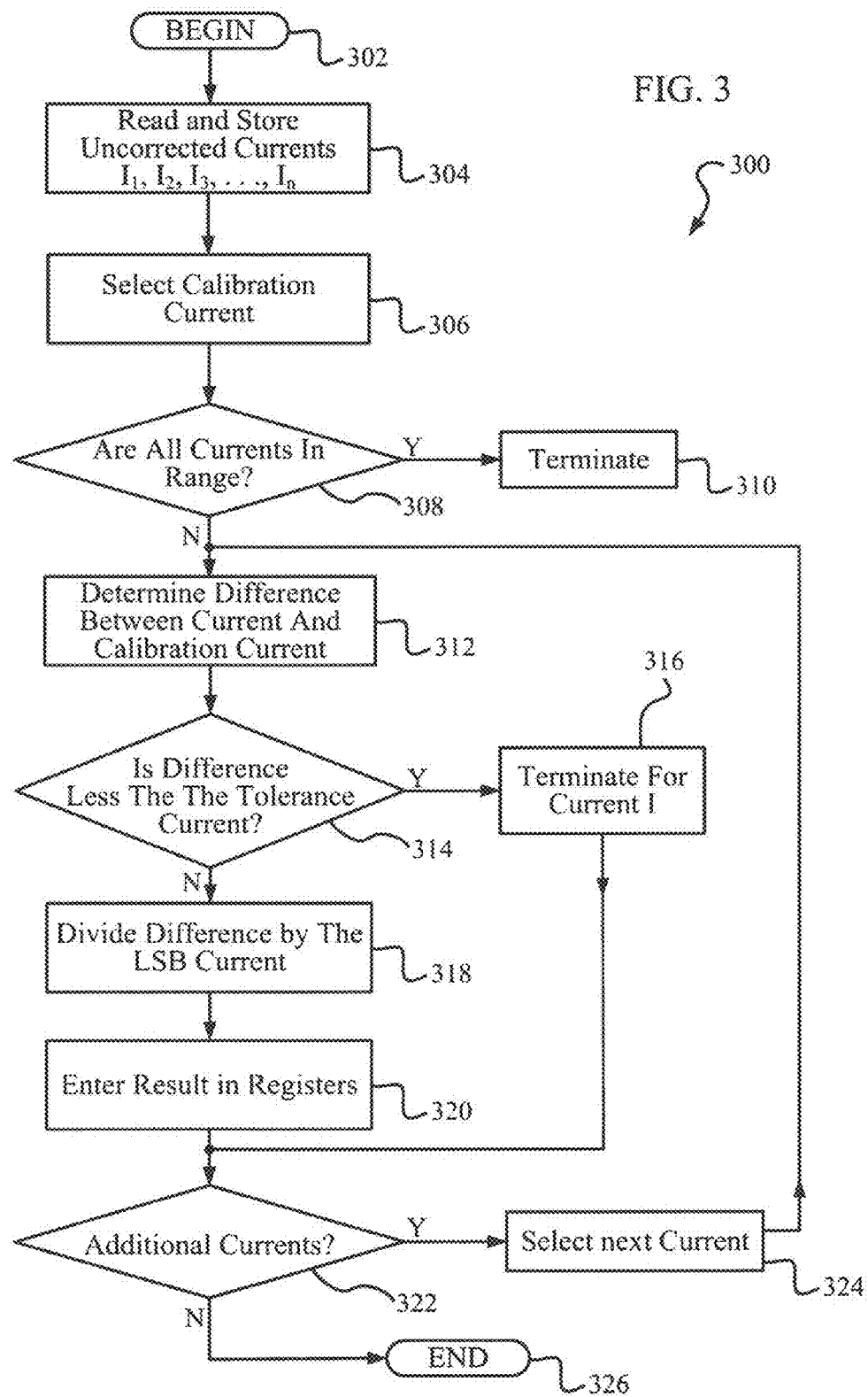
FIG. 3 is a flow chart illustrating a method of operating a plurality of DC offset correction loops, for example, the DC offset correction loops of FIG. 2.

FIG. 3 shows a flow chart illustrating a method 300 of operating a plurality of DC offset correction loops, for example, the DC offset correction loops illustrated in FIG. 2. The method 300 may be performed by the digital engine 134, controlling various components shown in FIG. 2. The method 300 may begin, or be called to operate, with block 302.

In block 304, a plurality of uncorrected currents are read and stored, for example currents $I_1, I_2, I_3, \ldots, I_n$. Currents $I_1, I_2, I_3, \ldots, I_n$ may represent currents on quadrature signal legs, such as, but not limited to, Ip, Im, Qp, and Qm, which may represent such quadrature signal legs for more than one transmission path. The plurality of uncorrected currents may be read by selectively closing calibration switches 126 and 128 while selectively opening switch 106 in each correction loop, and using analog-to-digital converter 132 to read the voltage produced across resistor array 130 for each loop, as a plurality of uncorrected currents are provided by baseband block 202. Block 304 may also include sub-steps such as adjusting a gain of the current digital-to-analog converter associated with baseband current supply 102, adjusting a gain of the baseband filter associated with baseband current supply 102, and adjusting the bandwidth of the baseband filter, for the plurality of uncorrected currents.

In block 306, a calibration current is selected. In one implementation, the calibration current is selected to be equal to the first of the plurality of uncorrected currents, for example $I_1$ where, for example, $I_1$ may be the uncorrected current on differential signal leg Ip. However, those skilled in the art will recognize that a variety of calibration currents may be selected, including, but not limited to currents associated with any of the other uncorrected currents, predetermined signals, signals of known amplitude, sinusoids of known amplitude, and modulated signals of known amplitude.

In block 308, a determination is made as to whether all of the measured, uncorrected currents are within a range in which DC offset correction may be beneficially performed without degrading the signal legs. In one exemplary implementation, the current range may be between 1 micro-amp and 250 micro-amps. If all uncorrected currents are not within the range in which DC offset correction may be beneficially performed, the method 300 terminates in block 310. If all uncorrected currents are within a range in which DC offset correction may be beneficially performed, the method 300 proceeds to block 312.

In block 312, the difference between the calibration current, for example $I_1$, and one of the uncorrected currents is determined. Where the first uncorrected current is selected as the calibration current, the result may be zero for the first current.

In block 314, a determination is made whether the result of block 312 is less than a predetermined tolerance current. If the result of block 312 is less than the tolerance current, the method 300 proceeds to block 316 and the processing for the present signal leg is terminated. If the result of block 312 is greater than the tolerance current, the method 300 moves to block 318 and the result of block 312 is divided by the least significant bit current. The least significant bit current may be set as the resolution of analog-to-digital converter 132.

In block 320, the result of block 318 may be entered in storage registers. For example, in registers associated with programmable current source 118, programmable current sink 120, and/or the current digital-to-analog converter (not shown) associated with the present signal leg.

In block 322, a determination is made as to whether additional signal legs remain to be processed. If additional uncorrected signal leg currents remain to be processed, the next uncorrected current is selected and the method 300 returns to block 312. For example, if the first current processed through blocks 312 through 320 was $I_1$, the method 300 may next select current $I_2$ in block 324 and begin processing current $I_2$ in block 312. The method 300 may proceed with processing uncorrected currents through blocks 312 through 320 until the plurality of uncorrected currents, $I_1, I_2, I_3, \ldots I_n$, are processed. When it is determined in block 322 that all uncorrected currents have been processed, the method 300 terminates in block 326.

In the method 300, the DC currents associated with each of the plurality of uncorrected currents may be sequentially converted to voltages using resistor array 130 and read by analog-to-digital converter 132. Codes corresponding to the voltages may be stored in digital engine 134. The code associated with the first of the plurality of uncorrected currents may be used as a reference calibration code. An algebraic subtraction may be performed between each of the voltage codes and the reference calibration code. The differences (positive or negative) between the uncorrected voltage codes and the reference code may then be used to program, respectively, each of the offset current supplies 136a-d to produce and inject compensation currents, respectively, into the uncorrected signal legs to correct the DC offsets between the signal legs. The above process of determining and applying the differences between the voltage codes and the reference calibration code represents a one-shot search approach to DC offset correction of signal legs, which approach significantly reduces the calibration time. Using this one-shot search approach, differential signal legs on a transmission path can be quickly balanced with respect, to one another in order to improve the performance of a digital transmitter.

The functionality, operations and architecture depicted by the blocks of method 300 may be implemented using modules, segments, and/or portions of software and/or firmware code. The modules, segments, and/or portions of code include one or more executable instructions for implementing the specified logical functions). In some implementations, the functions noted in the blocks may occur in a different order than that shown in FIG. 3. For example, two blocks shown in succession in FIG. 3 may be executed concurrently or the blocks may sometimes be executed in another order, depending upon the functionality involved.

Among the advantages of the method and apparatuses disclosed herein is that they require minimal additional circuitry beyond that in some known transmitters and they require only a small additional die area in modern CMOS processes. For example, method 300 may require only components such as resistor array 130, current source 118, current sink 120, and switches 106, 114, 116, 126, and 128, beyond those components provided in some known transmitters. In addition, the DC offset correction techniques disclosed herein are relatively fast, as the conversion time roughly corresponds to n times the analog-to-digital conversion time, for example the conversion time required by analog-to-digital converter 132, where n is the number of signal legs to be corrected. For example, for an analog-to-digital conversion time of 20 micro-seconds, the analog-to-digital measurement time associated with quadrature signals on two paths may 160 micro-seconds (8×20 micro-seconds). Digital operations that may be performed in method 300, such as subtraction and programming of registers may be less than 10 micro-seconds.

A plurality of calibration signal types may be used with the DC offset correction loops and method 300. The calibration signal types may be selectively provided by the baseband current supplies 102, 102a-d. For example, a first type may be a DC current of a designated amplitude, a second type may be a sinusoid of a designated amplitude, and a third type may be a modulated signal of a designated amplitude that correlates to the differential signal leg. The DC current of a designated amplitude may be the simplest manner of correcting DC offsets, and may be employed without using a look-up table. However, the DC current of a designated amplitude may not take into account variations between the current digital-to-analog converter and baseband filter gains.

The sinusoid of a designated amplitude may include operating range offsets for the current digital-to-analog converter and baseband filter gains. The sinusoid of a designated amplitude may be more accurate since some AC parasitic components may be accounted for. The sinusoid of a designated amplitude may require precisely syncing the sampling time of the sinusoid of a designated amplitude with the differential signal legs to avoid phase differences. However, since the resulting signal may vary from a sinusoidal signal, offset adjustments may be over-corrected or under-corrected depending upon the differences between differential signal legs.

The modulated signal of a designated amplitude that correlates to the differential signal leg may be the most accurate since the transmitter operation relative weighting of various codes may be better represented. The modulated signal of a designated amplitude that correlates to the differential signal leg may allow for adjustments based upon the typical resulting multiplexed signal and its peak-to-average ratio. The modulated signal of a designated amplitude that correlates to the differential signal leg may use the average of the resulting multiplexed signal over a period of time.

The DC offset in the differential signal legs may vary between the bits generated from the current digital-to-analog converter and between the various gain settings of the baseband filter. Additional correction steps incorporated into the method 300 and used with DC offset correction loops described herein may include selecting a current and gain setting that may best represent the expected differential signal leg. For example, a current and gain setting may be selected based on the expected minimum peak, the expected average, and the expected maximum peak, while performing DC offset correction for the selected current and gain setting. Non-selected current and gain settings may have similar, but slightly varying DC offsets.

Other correction steps incorporated into the method 300 and used with DC offset correction loops described herein may also include performing offset calculations for various current digital-to-analog converter settings and baseband filter settings and storing the results in a look-up table that may be incorporated into the digital engine 134. Currents corresponding to the various gain settings may be measured and a DC offset correction may then be stored, for example in the digital engine 134 and/or the baseband current supply 102, and/or a communication processing chip (not shown).

The DC offset correction techniques described herein may employ fast analog-to-digital converters, for example, where analog-to-digital converter 134 is a flash analog-to-digital converter 134. In some implementations, the DC offset current supply 136 may be eliminated by various current digital-to-analog converter settings and baseband filter settings and storing the results in a look-up table.

In some configurations, the DC correction loops of FIGS. 1 and 2 and the method 300 are included in a mobile station modem (MSM) chip capable of controlling overall operation of a wireless communication device, such as a cellular phone, personal digital assistant (PDA), a satellite telephone, a portable computer, or any of a variety of devices capable of wireless communication.

In one or more exemplary embodiments, the functions described may be implemented in hardware, software, firmware, or any combination thereof. If implemented in software, the functions may be stored on or transmitted over as instructions or code on one or more computer-readable media. Computer-readable medium includes both computer storage medium and communication medium, including any medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

The above description of the disclosed embodiments is provided to enable any person skilled in the art to make or use that which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings.

What is claimed is:

1. An apparatus, comprising:
a converter configured to provide digital representations of a plurality of DC currents associated, respectively, with a plurality of differential signal legs;
a digital engine configured to receive the digital representations and to produce instructions for generating compensating currents for the plurality of differential signal legs based on comparisons, respectively, between each of the digital representations and a calibration current; and
a plurality of programmable current supplies corresponding, respectively, to the differential signal legs and configured to inject the compensating currents into the differential signal legs, respectively, to reduce DC offset between the differential signal legs, based upon the instructions.

2. The apparatus of claim 1, wherein the converter is an analog-to-digital converter.

3. The apparatus of claim 1, further comprising a resistor array configured to allow determination of the DC currents.

4. The apparatus of claim 1, wherein one of the digital representations is the calibration current.

5. The apparatus of claim 1, wherein at least one of the current supplies comprises a programmable current source.

6. The apparatus of claim 5, wherein at least one of the current supplies further comprises a programmable current sink.

7. An apparatus, comprising:
means for providing digital representations of a plurality of DC currents associated, respectively, with a plurality of differential signal legs;
means for receive for producing instructions to generate compensating currents for the plurality of differential signal legs based on comparisons, respectively, between each of the digital representations and a calibration current; and means for injecting the compensating currents into the differential signal legs, respectively, to reduce DC offset between the differential signal legs, based upon the instructions.

8. The apparatus of claim 7, wherein the injecting means includes a programmable current source.

9. The apparatus of claim 8, wherein the programmable current source is a digital-to-analog converter.

10. The apparatus of claim 8, wherein the injecting means includes a programmable current sink.

11. The apparatus of claim 10, wherein the programmable current sink is a digital-to-analog converter.

12. A method for reducing DC offset in a transmission path, comprising:
   determining a plurality of DC currents, the DC currents respectively associated with a plurality of differential signal legs in the transmission path;
   selecting a calibration current;
   determining the difference between each of the DC currents and the calibration current to produce a plurality of differences; and
   injecting each of the differences into a respective differential signal leg.

13. The method of claim 12, further comprising dividing the differences by a least significant bit current.

14. The method of claim 13, wherein the least significant bit current corresponds to the resolution of an analog-to-digital converter.

15. The method of claim 12, wherein the DC currents are determined using a resistor array operatively coupled to an analog-to-digital converter.

16. The method of claim 12, further comprising using a programmable current source and a programmable current sink to inject each of the differences.

17. The method of claim 12, wherein the differential signal legs are quadrature signal legs.

18. The method of claim 12, wherein determining a plurality of DC currents includes determining DC currents for a plurality of current digital-to-analog converter settings, wherein the current digital-to-analog converter is associated with a baseband current supply.

19. The method of claim 12, wherein determining a plurality of DC currents includes determining DC currents for a plurality of baseband fiber settings, wherein the baseband filter is associated with a baseband current supply.

20. The method of claim 12, wherein the calibration current is the DC current of one of the differential signal legs.

21. The method of claim 12, wherein the calibration current is a signal of predetermined amplitude.

22. The method of claim 12, wherein the calibration current is a sinusoid of predetermined amplitude.

23. The method of claim 12, wherein the calibration current includes is a modulated signal of predetermined amplitude.

24. A computer-readable medium embodying a set of instructions executable by one or more processors, comprising:
   code for determining a plurality of DC currents, the DC currents respectively associated with a plurality of differential signal legs in a transmission path;
   code for selecting a calibration current;
   code for determining the difference between each of the DC currents and the calibration current to produce a plurality of differences; and
   code for injecting each of the differences into a respective differential signal leg.

25. The computer-readable medium of claim 24, wherein the DC currents are determined using a resistor array operatively coupled to an analog-to-digital converter.

26. The computer-readable medium of claim 24, wherein the code for injecting includes code for configuring a programmable current source and a programmable current sink.

27. The computer-readable medium of claim 24, wherein the differential signal legs are quadrature signal legs.

28. The computer-readable medium of claim 24, further comprising code for dividing the differences by a least significant bit current.

29. The computer-readable medium of claim 28, wherein the least significant bit current corresponds to the resolution of an analog-to-digital converter.

* * * * *